(12) United States Patent
Kato et al.

(10) Patent No.: US 7,750,508 B2
(45) Date of Patent: Jul. 6, 2010

(54) CONTACTLESS POWER TRANSFERRING APPARATUS

(75) Inventors: Hiroshi Kato, Kanagawa (JP); Kuniharu Suzuki, Tokyo (JP); Katsuya Suzuki, Gunma (JP); Manabu Yamazaki, Kanagawa (JP); Yoichiro Kondo, Nagano (JP); Kota Onishi, Aichi (JP); Kentaro Yoda, Nagano (JP); Mikimoto Jin, Nagano (JP)

(73) Assignees: Sony Ericsson Mobile Communications Japan, Inc., Tokyo (JP); Seiko Epson Corporation, Tokyo (JP)

( * ) Notice: Subject to any disclaimer, the term of this patent is extended or adjusted under 35 U.S.C. 154(b) by 223 days.

(21) Appl. No.: 12/153,933

(22) Filed: May 28, 2008

(65) Prior Publication Data
US 2008/0296979 A1 Dec. 4, 2008

(30) Foreign Application Priority Data
May 28, 2007 (JP) .............................. 2007-140886

(51) Int. Cl.
*H01H 27/42* (2006.01)
(52) U.S. Cl. ...................................... 307/104; 307/150
(58) Field of Classification Search ................. 307/104, 307/150
See application file for complete search history.

(56) References Cited

U.S. PATENT DOCUMENTS 7,414,380 B2 * 8/2008 Tang et al. ................... 320/108

FOREIGN PATENT DOCUMENTS

| JP | 11-040206 A | 2/1999 |
| JP | 2001-060998 A | 3/2001 |
| JP | 2003-047180 A | 2/2003 |

* cited by examiner

*Primary Examiner*—Robert L. Deberadinis
(74) *Attorney, Agent, or Firm*—Rader, Fishman & Grauer PLLC

(57) ABSTRACT

A contactless power transferring apparatus includes a terminal loading portion, a primary coil, an up-down-direction pressing portion, a width direction pressing portion and a thickness direction pressing portion. The terminal loading portion has an opening through which a mobile terminal is inserted and loaded. The primary coil transfers power using electromagnetic induction to a secondary coil incorporated in the mobile terminal. When the mobile terminal is inserted inside the terminal loading portion, the pressing portions operate in an up-down direction, in a left-right direction and in a width direction, to press and support the mobile terminal respectively from below to position the coils in the up-down direction, from the width direction to position the coils in the left-right direction and from the thickness direction to dispose the coils a predetermined distance apart.

10 Claims, 10 Drawing Sheets

CONTACTLESS POWER TRANSFERRING APPARATUS

CROSS REFERENCES TO RELATED APPLICATIONS

The present invention contains subject matter related to Japanese Patent Application JP 2007-140886 filed in the Japanese Patent Office on May 28, 2007, the entire contents of which being incorporated herein by reference.

BACKGROUND OF THE INVENTION

1. Field of the Invention

The present invention relates to a contactless power transferring apparatus that transfers power using electromagnetic induction via a contactless power transferring coil when charging a secondary cell incorporated in a small mobile terminal such as a mobile phone unit.

2. Description of the Related Art

An existing system that transfers charging power for charging a secondary cell incorporated in a mobile terminal, for example, via a contactless power transferring coil using electromagnetic induction is known.

Japanese Unexamined Patent Application Publication No. 2001-60998 discloses a construction where contactless power transferring is carried out between a primary coil provided in a cradle and a secondary coil provided in a mobile telephone (see FIG. 1 and FIG. 2). The cradle has an enclosure portion with an opening in which the mobile telephone is set, and a primary coil is provided in a base portion of the enclosure portion for transferring power in a contactless manner. The mobile telephone includes a secondary coil in a case base portion thereof. When the mobile telephone is charged using such constructions, the mobile telephone is inserted into the opening in the enclosure portion of the cradle from above. By doing so, the primary coil of the enclosure portion of the cradle and the secondary coil at the case base portion of the mobile telephone become positioned facing one another and in this state, it becomes possible to carry out contactless power transferring between the primary coil of the cradle and the secondary coil of the mobile telephone.

Japanese Unexamined Patent Application Publication No. 2003-47180 also discloses a construction for carrying out contactless power transferring between a primary coil provided in a charger and a secondary coil provided in an electric appliance, such as a mobile telephone (see FIG. 1 to FIG. 3). The charger includes a support portion constructed so as to surround a trunk portion of the electric appliance and a primary coil is provided inside this support portion. The electric appliance is provided with a secondary coil that becomes positioned facing the primary coil inside the support portion when the electric appliance has been mounted on the support portion of the charger. According to these constructions, when the electric appliance is charged, the electric appliance is held within the support portion of the charger. By doing so, the primary coil inside the support portion of the charger and the secondary coil of the electric appliance become positioned facing one another, and in this state, it becomes possible to carry out contactless power transferring between the primary coil of the charger and the secondary coil of the electric appliance.

In addition, Japanese Unexamined Patent Application Publication No. H11-40206 discloses a construction that carries out contactless power transferring between a primary coil provided in a charger and a secondary coil provided in a mobile electric appliance such as a mobile telephone (see FIG. 1 and FIG. 4). The charger includes an attachment portion to which the mobile electric appliance is attached at a fixed position and is provided with a flat coil, produced by winding a wire in a spiral inside the attachment portion, as a primary coil. The mobile electric appliance is provided with a secondary coil at a position that faces the primary coil inside the attachment portion when the mobile electric appliance is attached to the attachment portion of the charger. The secondary coil of the mobile electric appliance is also formed of a flat coil produced by winding a wire in a spiral. According to these constructions, when the mobile electric appliance is charged, the mobile electric appliance is attached to the attachment portion of the charger. By doing so, the primary coil inside the attachment portion of the charger and the secondary coil of the mobile electric appliance become positioned facing one another, and in this state, it becomes possible to carry out contactless power transferring between the primary coil of the charger and the secondary coil of the mobile electric appliance.

SUMMARY OF THE INVENTION

When contactless power transferring using electromagnetic induction is employed as the method of transferring power from a cradle to a mobile terminal, electric contacts between the cradle and the mobile terminal may be unnecessary. Therefore, it is possible to provide a certain margin in the disposed position when the mobile terminal is placed on a terminal mount of the cradle and it is possible to design the form of the terminal mount of the cradle and the form of the mobile terminal with a certain degree of freedom.

However, when the center positions of both the contactless power transferring coil provided in the cradle and the contactless power transferring coil provided in the mobile terminal become greatly displaced or the separation distance between the coils is too great, there is a fall in the transmission power.

This means that in reality, the disposed position when the mobile terminal is mounted on the terminal mount of the cradle may be limited, and the form (design) of the terminal mount of the cradle and the form (design) of the mobile terminal may also be restricted.

That is, to prevent a fall in the transmitted power when the mobile terminal is placed on the terminal mount of the cradle, the displacement between the center positions of the primary coil of the cradle and the secondary coil of the mobile terminal may need to be suppressed to within a range of a few millimeters, for example. However, it may be difficult for a user to place the mobile terminal on the terminal mount of the cradle so that the displacement between the center positions of the coils is within the range of a few millimeters.

Also, it is possible to use a cradle design and a mobile terminal design where the mobile terminal is forcibly disposed at the ideal position so that the center positions of the coils may not become displaced. However, in such case, there are restrictions on both the form of the mobile terminal and the form of the terminal mount of the cradle, resulting in reduced design freedom for the terminal design and the cradle design. That is, the respective cradles for various types of mobile terminal of different forms will only be compliant with one out of the different types of terminal, so that the user may need to buy a new cradle every time the user changes his or her mobile terminal, which is extremely costly for the user.

Note that with the construction disclosed in Japanese Unexamined Patent Application Publication No. 2001-60998 described above, the forms of the enclosure portion of the cradle and the base portion of the mobile telephone substantially match, and therefore cradles that respectively correspond to different types of mobile telephones may be required. In the same way, with the construction disclosed Japanese Unexamined Patent Application Publication No. 2003-47180, since the forms of the support portion of the charger and the trunk portion of the electric appliance substantially match, chargers that respectively correspond to different types of mobile telephones may be required. In addition, the construction disclosed in Japanese Unexamined Patent Application Publication No. 2003-47180 does not particularly consider placing the center positions of the coils in a substantially matching state.

It is desirable to provide a contactless power transferring apparatus that can carry out contactless power transferring to a plurality of types of mobile terminal when carrying out contactless power transferring between a primary coil and a secondary coil. Using such an apparatus, the center positions of the coils can be aligned without the user carrying out a difficult operation, the coils can be disposed a predetermined distance apart, the restrictions on the form of the mobile terminal and the form of the terminal mount can be reduced.

According to an embodiment of the invention, there is provided a contactless power transferring apparatus. The contactless power transferring apparatus includes a terminal loading portion; a primary coil; an up-down-direction pressing portion; a width direction pressing portion; and a thickness direction pressing portion. The terminal loading portion has an opening of a size that is at least larger than an outer form of a mobile terminal and in which a mobile terminal inserted from the opening is loaded. The primary coil is disposed with a coil surface thereof substantially in parallel with a wall surface of the terminal loading portion and transfers power using electromagnetic induction to a secondary coil incorporated in the mobile terminal. The up-down-direction pressing portion is operable when the mobile terminal is inserted inside the terminal loading portion, to operate in an up-down direction that is a mobile-terminal loading and removing direction so as to press and support a case base surface of the mobile terminal from below and position the primary coil and the secondary coil of the mobile terminal in the up-down direction. The width direction pressing portion is operable when the mobile terminal is inserted inside the terminal loading portion, to operate in a width direction of the mobile terminal so as to press and support the mobile terminal in the width direction and position the primary coil and the secondary coil of the mobile terminal in a left-right direction. The thickness direction pressing portion is operable when the mobile terminal is inserted inside the terminal loading portion, to operate in a thickness direction of the mobile terminal so as to press and support the mobile terminal in the thickness direction and dispose the primary coil and the secondary coil of the mobile terminal a predetermined distance apart.

That is, according to an embodiment of the invention, the opening of the terminal loading portion is larger than the outer form of the mobile terminal, and inside the terminal loading portion, the mobile terminal is supported from at least three directions that are the width direction, the thickness direction, and the up-down direction so that the primary coil and the secondary coil are aligned. This means that according to an embodiment of the invention, by merely inserting the mobile terminal into the terminal loading portion, it is possible to align the center positions of the primary coil and the secondary coil and simultaneously dispose the coils a predetermined distance apart.

According to an embodiment of the invention, it is possible to align the center positions of a primary coil and a secondary coil and simultaneously dispose the coils a predetermined distance apart by merely inserting a mobile terminal into a terminal loading portion of a contactless power transferring apparatus. Therefore, when carrying out contactless power transferring, the user may not need to carry out a difficult operation such as aligning the center positions of the coils. Also, according to an embodiment of the invention, the opening of the terminal mounting portion has a sufficient size for loading a plurality of types of mobile terminal of different outer forms, sizes, and the like, and a construction that simultaneously carries out positioning in the width direction, the thickness direction, and the up-down direction of the mobile terminal is also provided inside the terminal loading portion. Accordingly, it is possible to transfer power to a variety of types of mobile terminal with few restrictions on the form of the mobile terminal and the form of the terminal loading portion, and therefore it is not necessary for the user to buy a new cradle every time the user buys a new mobile terminal, for example.

DESCRIPTION OF THE PREFERRED EMBODIMENTS

Preferred embodiments of the invention will now be described with reference to the attached drawings.

In the present embodiment, a cradle that uses a flat coil as a primary-side contactless power transferring coil and transfers power using electromagnetic induction to a flat coil ("secondary coil") provided in a mobile phone unit that is one example of a mobile terminal according to an embodiment of the invention is described as one example of a contactless power transferring apparatus according to an embodiment of the invention. The primary-side contactless power transferring coil is formed by winding a linear conductor made of a solid wire, a twisted wire, or flat pattern, into a spiral on a substantially flat plane. Similarly, a system formed of the mobile phone unit and the cradle is given as an example of a contactless power transferring system according to an embodiment of the invention. However, it should be appreciated that the details of such cradle and system are mere examples and that embodiments of the invention are not limited to these examples.

Constructions of Cradle and Mobile Phone Unit

FIG. 1 to FIG. 9 are diagrams showing the constructions of a cradle 1 and a mobile phone unit 2 according to an embodiment of the invention.

Figure 1:
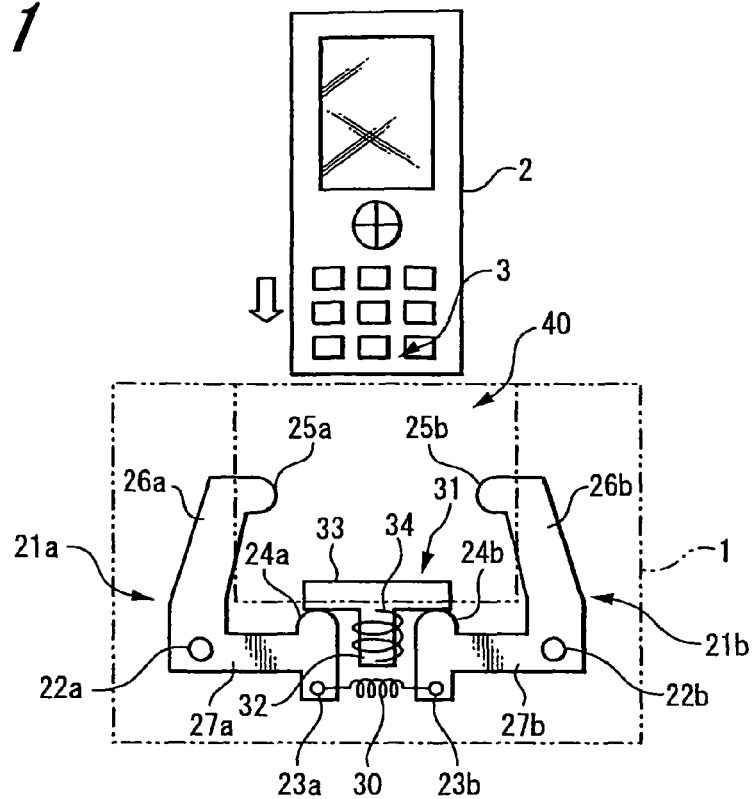
FIG. 1 is a view showing a state before a mobile phone unit is attached to a cradle when looking from the front of the mobile phone unit.
Figure 2:
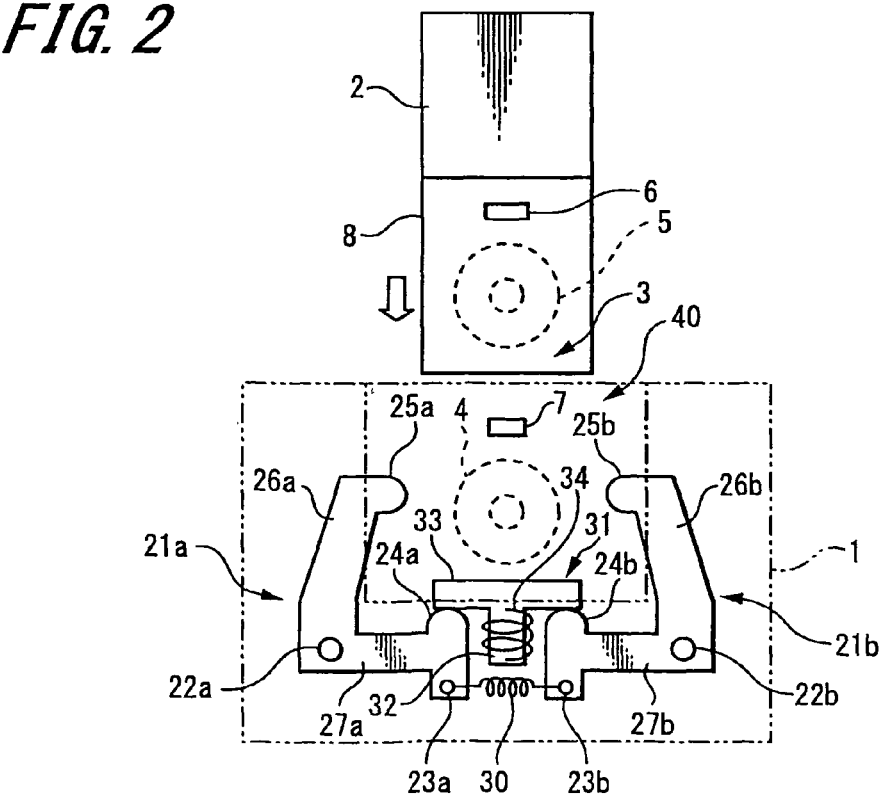
FIG. 2 is a view showing a state before the mobile phone unit is attached to the cradle when looking from the rear of the mobile phone unit.
Figure 3:
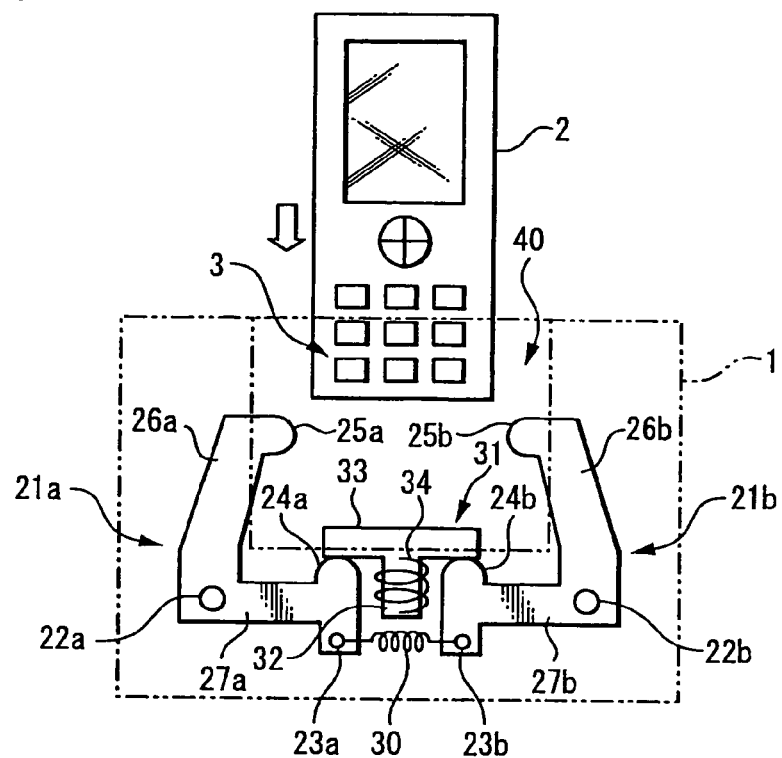
FIG. 3 is a view showing a state where the mobile phone unit is being attached to the cradle when looking from the front of the mobile phone unit.
Figure 4:
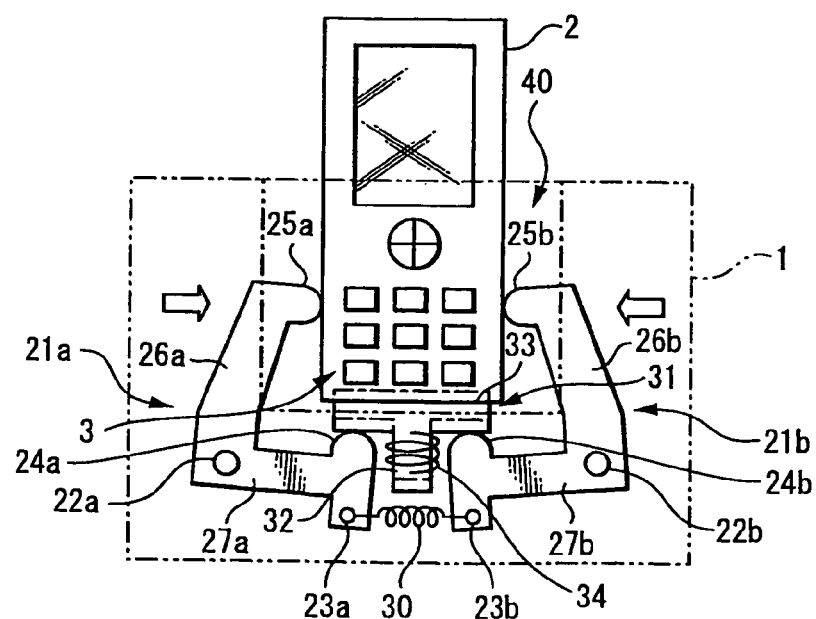
FIG. 4 is a view showing a state where the mobile phone unit has been attached to the cradle when looking from the front of the mobile phone unit.
Figure 5:
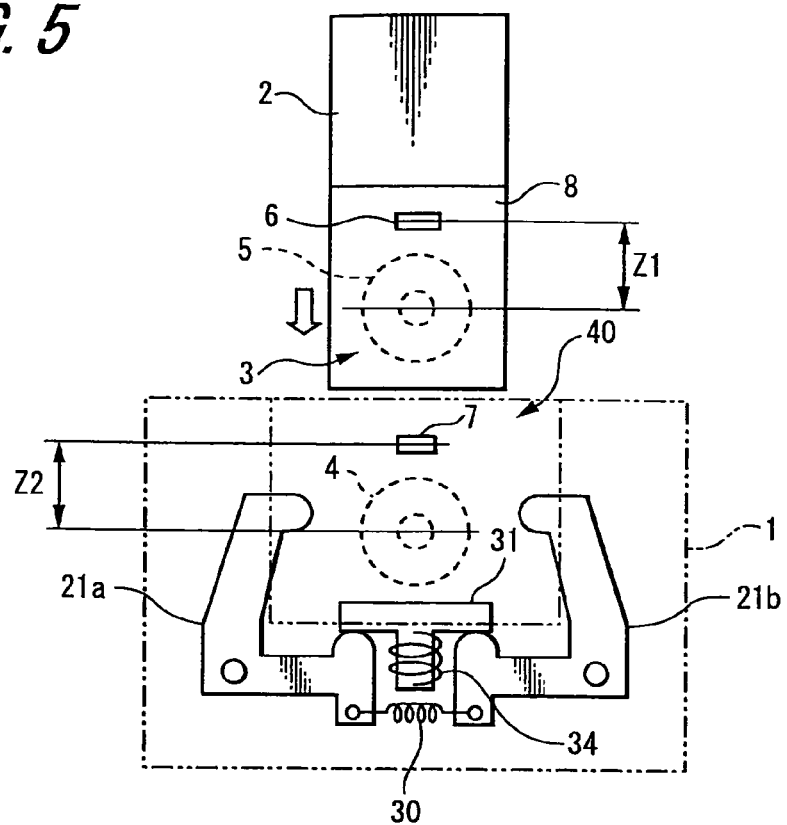
FIG. 5 is a view showing the positional relationship between primary and secondary coils, a terminal-side positioning portion and a cradle-side positioning portion when looking from the rear of the mobile phone unit before the mobile phone unit is attached to the cradle according to an embodiment of the invention.
Figure 6:
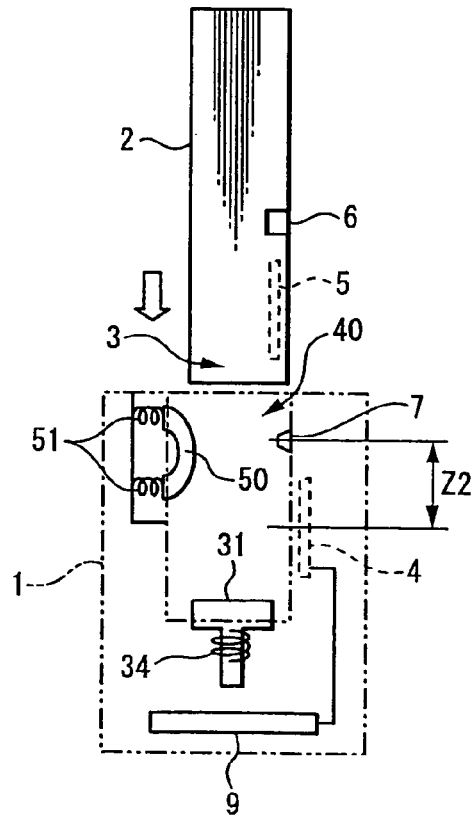
FIG. 6 is a view showing a state before the mobile phone unit is attached to the cradle according to an embodiment of the invention when looking from a side of the mobile phone unit.
Figure 7:
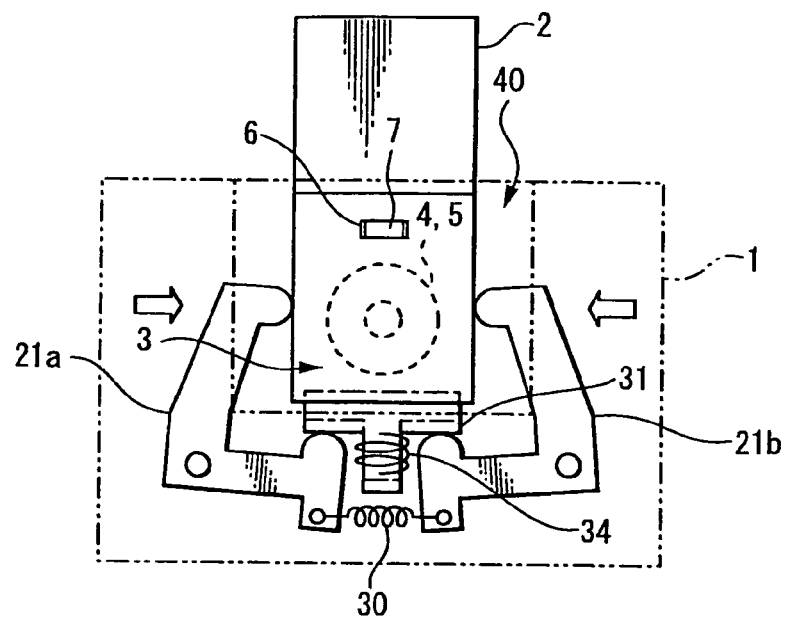
FIG. 7 is a view showing a state where the mobile phone unit has been attached to the cradle according to an embodiment of the invention when looking from the rear of the mobile phone unit.
Figure 8:
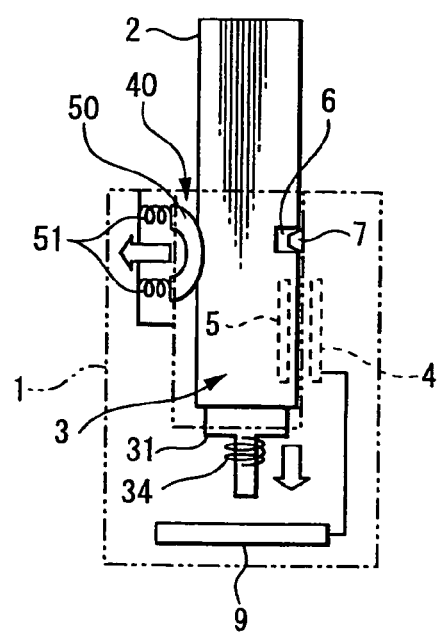
FIG. 8 is a view showing a state where the mobile phone unit has been attached to the cradle according to an embodiment of the invention when looking from the side of the mobile phone unit.
Figure 9:
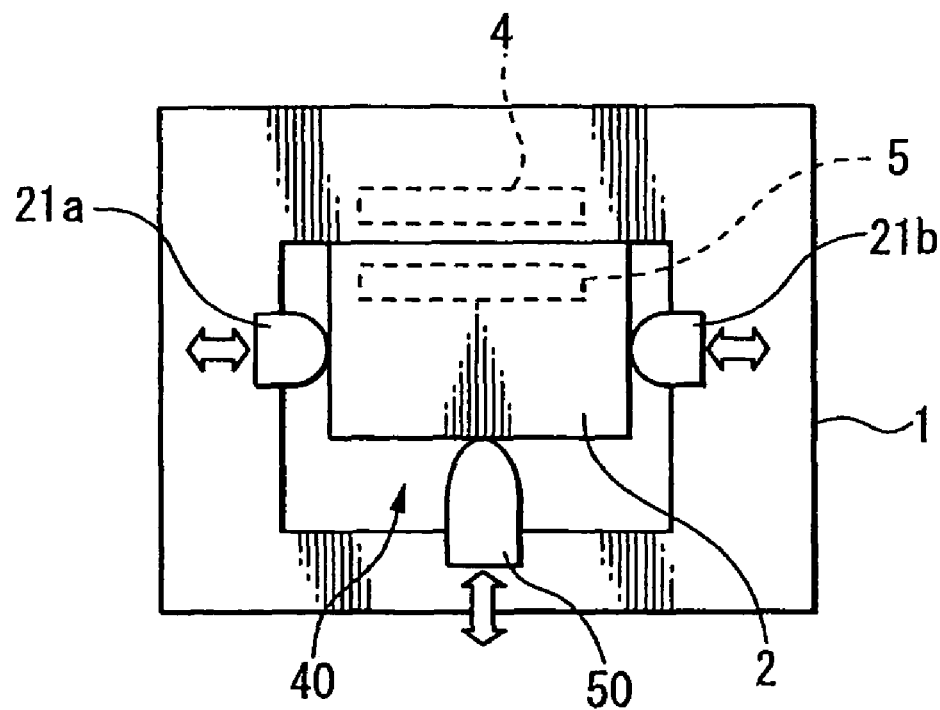
FIG. 9 is a view showing a state where the mobile phone unit has been attached to the cradle when looking from above (i.e., from the opening side of a terminal loading portion).

Note that FIG. 1 is a diagram showing a state before the mobile phone unit 2 is loaded in a terminal loading portion 40 of the cradle 1 when looking from the front of the mobile phone unit 2. FIG. 2 is a diagram showing a state before the mobile phone unit 2 is loaded in the terminal loading portion 40 of the cradle 1 when looking from the rear of the mobile phone unit 2. FIG. 3 is a diagram showing a state where the mobile phone unit 2 is being loaded in the terminal loading portion 40 of the cradle 1 when looking from the front of the mobile phone unit 2. FIG. 4 is a diagram showing a state where the mobile phone unit 2 has been loaded in the terminal loading portion 40 of the cradle 1 when looking from the front of the mobile phone unit 2. FIG. 5 is a diagram showing the positional relationship between primary and secondary coils 4, 5, a terminal-side positioning portion 6 and a cradle-side positioning portion 7 when looking from the rear of the mobile phone unit 2 before the mobile phone unit 2 is loaded in a terminal loading portion 40 of the cradle 1. FIG. 6 is a diagram showing a state before the mobile phone unit 2 is loaded in the terminal loading portion 40 of the cradle 1 when looking from a side of the mobile phone unit 2. FIG. 7 is a diagram showing a state where the mobile phone unit 2 has been loaded in the terminal loading portion 40 of the cradle 1 when looking from the rear of the mobile phone unit 2. FIG. 8 is a diagram showing a state where the mobile phone unit 2 has been loaded in the terminal loading portion 40 of the cradle 1 when looking from the side of the mobile phone unit 2. FIG. 9 is a diagram showing a state where the mobile phone unit 2 has been loaded in the terminal loading portion 40 of the cradle 1 when looking from above (i.e., from the opening side of the terminal loading portion 40). The component element designated by the reference numeral 9 in FIG. 6 and FIG. 8 is a control circuit of a primary coil 4 of the cradle 1.

The cradle 1 in the present embodiment includes a case, which is, for example, shaped as a quadrangular box or a cylinder and a terminal loading portion 40 into which the mobile phone unit 2 is loaded by being inserted from above. Note that although the detailed construction is described later, when a cylindrical case is used, a construction where the primary and secondary coils and/or a unit where pressing portions are integrated are rotatable with respect to a cradle main body (more specifically, the case and parts, such as a power cable, for which fixed positions are preferable) may be used.

The terminal loading portion 40 has an opening in which a terminal end portion 3, which is the end of the mobile phone unit 2 at which the secondary coil 5 is installed, is loaded. This opening in the terminal loading portion 40 is formed sufficiently larger than the outer cover of the terminal end portion 3 of the mobile phone unit 2. That is, the terminal loading portion 40 of the cradle 1 in the present embodiment includes an opening with a size that enables various mobile phone units with terminal end portions of different shapes to be loaded.

The following components are provided inside the terminal loading portion 40: a flat primary coil 4; width-direction pressing portions 21a, 21b; an up-down-direction pressing portion 31; a thickness direction pressing portion 50; and a convex cradle-side positioning portion 7. The flat primary coil 4 transfers power when disposed facing a flat secondary coil 5 that is stuck substantially in parallel to a battery cover 8, for example, of a battery enclosure provided near the terminal end portion 3 of the mobile phone unit 2. The width-direction pressing portion 21a, 21b act in the width direction of the terminal end portion 3 of the mobile phone unit 2 when the mobile phone unit 2 is loaded so as to press and support the terminal end portion 3 from the width direction thereof and thereby position the primary coil 4 and the secondary coil 5 in the left-right direction (i.e., the "width direction"). The up-down-direction pressing portion 31 acts in the insertion-detachment direction (that is, the "up-down direction") of the mobile phone unit 2 and presses and supports a cover bottom surface of the terminal end portion 3 from below to position the primary coil 4 and the secondary coil 5 in the up-down direction. The thickness direction pressing portion 50 acts in the thickness direction (that is, a direction that is perpendicular to the width direction) of the terminal end portion 3 of the mobile phone unit 2 so as to press and support the terminal end portion 3 from the thickness direction thereof and thereby position the primary coil 4 and the secondary coil 5. The convex cradle-side positioning portion 7 fits into a concave terminal-side positioning portion 6, for example, provided on a rear surface, for example, of the mobile phone unit 2 to position the mobile phone unit 2 (i.e., to position the primary coil 4 and the secondary coil 5) The rear surface is the opposite surface to the surface where a liquid crystal display and key operation unit are provided, that is, the battery cover 8 side. Note that the primary coil 4 is disposed on a wall surface of the terminal loading portion 40 substantially in parallel with the wall surface.

The up-down-direction pressing portion 31 includes a case base surface contacting portion 33 and a spring support protruding portion 32. The case base surface contacting portion 33 contacts a case base portion surface of the terminal end portion 3, presses and supports the mobile phone unit 2 from below in the insertion/detachment direction when the terminal end portion 3 of the mobile phone unit 2 has been loaded inside the terminal loading portion 40. One end of a coil spring 34 is fitted over the spring support protruding portion 32. The other end of the coil spring 34 contacts a spring retaining portion, not shown, on the cradle 1.

As shown in FIG. 1 to FIG. 3, FIG. 5, and FIG. 6, when the terminal end portion 3 of the mobile phone unit 2 is not loaded inside the terminal loading portion 40, the case base surface contacting portion 33 of the up-down-direction pressing portion 31 protrudes the furthest upward inside the terminal loading portion 40 due to the reaction force of the coil spring 34 and the like.

As shown in FIG. 4, FIG. 7, and FIG. 8, when the terminal end portion 3 of the mobile phone unit 2 is loaded inside the terminal loading portion 40, the case bottom surface of the terminal end portion 3 of the mobile phone unit 2 contacts the case base surface contacting portion 33. As a result, the up-down-direction pressing portion 31 is pressed by the weight of the mobile phone unit 2 so as to move in the direction where the coil spring 34 is compressed, or in other words, downward inside the terminal loading portion 40.

On the other hand, when the terminal end portion 3 of the mobile phone unit 2 is removed from inside the terminal loading portion 40, the weight of the mobile phone unit 2 that acted upon the case base surface contacting portion 33 is removed. Subsequently, as shown in FIG. 1 to FIG. 3, FIG. 5, and FIG. 6, the up-down-direction pressing portion 31 returns to the state where the case base surface contacting portion 33 protrudes the furthest upward inside the terminal loading portion 40 due to the reaction force of the coil spring 34 and the like.

Figure 10:
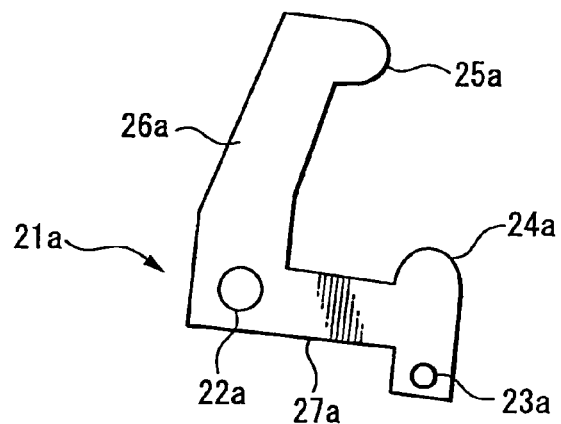
FIG. 10 is an enlargement of a width-direction pressing portion.

The width-direction pressing portion 21a includes: a case side surface contacting portion 25a; a rotational shaft 22a, an upper arm portion 26a, a rear surface contacting portion 24a, a spring end engaging portion 23a, and a lower arm portion 27a. The case side surface contacting portion 25a contacts one side surface of the terminal end portion 3 when the terminal end portion 3 of the mobile phone unit 2 has been loaded inside the terminal loading portion 40, to press and support the mobile phone unit 2 from one side thereof. The rotational shaft 22a is supported on the case of the cradle 1. The upper arm portion 26a connects the rotational shaft 22a and the case side surface contacting portion 25a. The rear surface contacting portion 24a faces and contacts a rear surface of the case base surface contacting portion 33 of the up-down-direction pressing portion 31. The spring end engaging portion 23a is engaged by one end of a coil spring 30. The lower arm portion 27a connects the rear surface contacting portion 24a and the spring end engaging portion 23a to the rotational shaft 22a. Note that FIG. 10 shows an enlargement of only the width-direction pressing portion 21a. Similarly, the width-direction pressing portion 21b includes: a case side surface contacting portion 25b, a rotational shaft 22b, an upper arm portion 26b, a rear surface contacting portion 24b, a spring end engaging portion 23b, and a lower arm portion 27b. The case side surface contacting portion 25b contacts the other side surface of the terminal end portion 3 when the terminal end portion 3 of the mobile phone unit 2 has been loaded inside the terminal loading portion 40, to press and support the mobile phone unit 2 from the other side thereof. The rotational shaft 22b is supported on the case of the cradle 1. The upper arm portion 26b contacts the rotational shaft 22b and the case side surface contacting portion 25b. The rear surface contacting portion 24b faces and contacts the rear surface of the case base surface contacting portion 33 of the up-down-direction pressing portion 31. The spring end engaging portion 23b is engaged by the other end of the coil spring 30. The lower arm portion 27b connects the rear surface contacting portion 24b and the spring end engaging portion 23b to the rotational shaft 22b.

As shown in FIG. 1 to FIG. 3, FIG. 5, and FIG. 6, when the terminal end portion 3 of the mobile phone unit 2 is not loaded inside the terminal loading portion 40, the width-direction pressing portions 21a, 21b are pulled by the tension of the coil spring 34 so that the distance between both case side surface contacting portions 25a, 25b inside the terminal loading portion 40 is maximized.

Subsequently, as shown in FIG. 4, FIG. 7, FIG. 8, and FIG. 9, when the terminal end portion 3 of the mobile phone unit 2 has been loaded inside the terminal loading portion 40, the case base surface of the terminal end portion 3 of the mobile phone unit 2 has contacted the case base surface contacting portion 33 of the up-down-direction pressing portion 31. The up-down-direction pressing portion 31 has been pressed and moved downward inside the terminal loading portion 40 due to the weight of the mobile phone unit 2. Accordingly, the up-down-direction pressing portion 31 presses both rear surface contacting portions 24a, 24b so that the coil spring 30, ends of which engage the spring end engaging portions 23a, 23b, becomes extended. At the same time, the force applied to the up-down-direction pressing portion 31 (i.e., the weight of the mobile phone unit 2) is converted and transmitted as a force that rotates both lower arm portions 27a, 27b and both upper arm portions 26a, 26b about the rotational shafts 22a, 22b as the centers of rotation. As a result, both case side surface contacting portions 25a, 25b move in a direction where the distance therebetween decreases. By doing so, when the terminal end portion 3 of the mobile phone unit 2 is loaded inside the terminal loading portion 40, the mobile phone unit 2 is pressed and supported in the width direction by both case side surface contacting portions 25a, 25b.

On the other hand, when the terminal end portion 3 of the mobile phone unit 2 is removed from the terminal loading portion 40, as shown in FIG. 1 to FIG. 3, FIG. 5, and FIG. 6, the case base surface of the terminal end portion 3 of the mobile phone unit 2 is separated from the case base surface contacting portion 33 of the up-down-direction pressing portion 31. Accordingly, the weight of the mobile phone unit 2 that was applied to the up-down-direction pressing portion 31 is removed. As a result, the up-down-direction pressing portion 31 moves so as to protrude upward inside the terminal loading portion 40. Subsequently, due to the tension of the coil spring 30, ends of which engage the spring end engaging portions 23a, 23b, both lower arm portions 27a, 27b and both upper arm portions 26a, 26b rotate about the rotational shafts 22a, 22b as centers of rotation. By doing so, the case side surface contacting portions 25a, 25b return to the state with the maximum distance therebetween.

Figure 11:
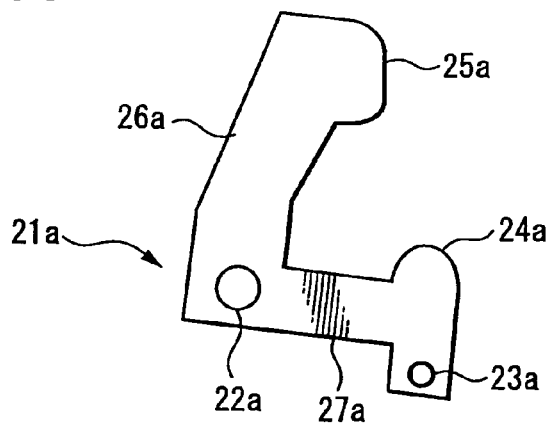
FIG. 11 is an enlargement of a width-direction pressing portion including a case side surface contacting portion with a surface of a certain size.
Figure 12:
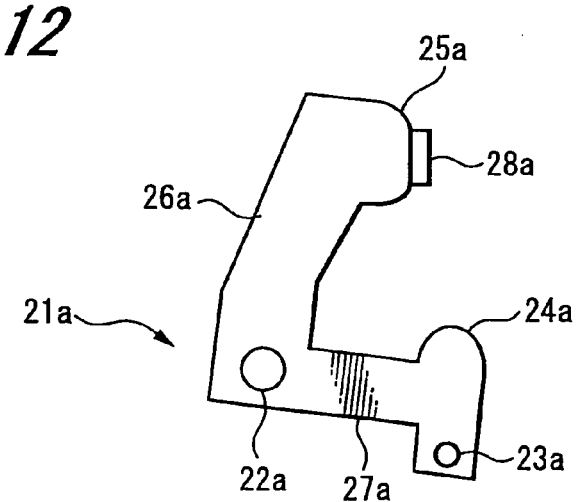
FIG. 12 is an enlargement of a width-direction pressing portion including a case side surface contacting portion with a surface of a certain size and a protective member on a front end thereof.

Note that an example construction has been described where the width-direction pressing portion 21a shown in FIG. 1 to FIG. 5, FIG. 7, and FIG. 10 has the case side surface contacting portion 25a that is substantially circular and point contact is made between the case side surface contacting portion 25a and the side surface of the mobile phone unit 2. However, it is also possible, as shown in FIG. 11 and FIG. 12, to form one part of the case side surface contacting portion 25a as a substantially linear portion, so that surface contact is made between the case side surface contacting portion 25a and the side surface of the mobile phone unit 2. Note that although only the width-direction pressing portion 21a is shown in FIG. 11 and FIG. 12, the width-direction pressing portion 21b is constructed in the same way. In the example construction shown in FIG. 11, the part of the case side surface contacting portion 25a that contacts the side surface of the mobile phone unit 2 has a certain width so that the side surface of the mobile phone unit 2 can be supported by surface contact. When the side surface of the mobile phone unit 2 is supported by surface contact as in the example shown in FIG. 11, it is possible to increase the force that supports the side surface of the mobile phone unit 2 and also to reduce damage to the side surface of the mobile phone unit 2. FIG. 12 shows one example of a construction where the side surface of the mobile phone unit 2 is supported by surface contact as in FIG. 11. In this example, a protective member 28a made of rubber, an elastomer, a sponge, or the like is provided on the surface of the case side surface contacting portion 25a to provide even more protection against damage than the example in FIG. 11.

Figure 13:
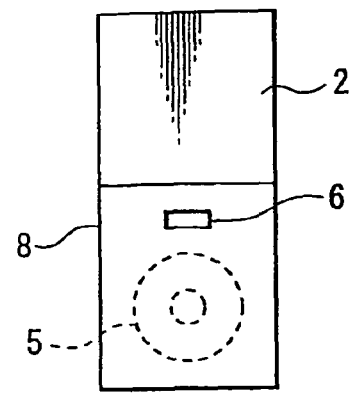
FIG. 13 is a view of a mobile phone unit according to an embodiment of the invention when looking from the rear.

The cradle-side positioning portion 7 protrudes from a wall surface of the terminal loading portion 40 as shown in FIG. 2 and FIG. 5 to FIG. 8, and is formed as a tapered protrusion, for example, as shown in FIG. 6 and FIG. 8. As shown in FIG. 2, FIG. 5 to FIG. 8, and FIG. 13, the terminal-side positioning portion 6 is provided on the rear surface, for example, (on a rear surface with respect to the liquid crystal display and the key operation unit, that is, on the battery cover 8 side) of the mobile phone unit 2. Further, as shown in FIG. 6 and FIG. 8, the terminal-side positioning portion 6 is formed as a concave that is depressed from the rear wall surface of the case of the mobile phone unit 2. Note that FIG. 13 is a diagram showing the mobile phone unit 2 when looking from the rear thereof.

When the terminal end portion 3 of the mobile phone unit 2 is loaded in the terminal loading portion 40, the protruding part of the cradle-side positioning portion 7 fits into the concave portion of the terminal-side positioning portion 6. Accordingly, the position of the mobile phone unit 2 inside the terminal loading portion 40 is set so that the center positions of the primary coil 4 of the cradle 1 and secondary coil 5 of the mobile phone unit 2 substantially match. The engagement between the cradle-side positioning portion 7 and the terminal-side positioning portion 6 also acts so as to prevent the mobile phone unit 2 from springing out of the terminal loading portion 40 due to a reaction force of the coil spring 34 and the tension of the coil spring 30.

Note that as shown in FIG. 2, and FIG. 5 to FIG. 8, the relationship between the distance Z2 from the cradle-side positioning portion 7 inside the terminal loading portion 40 of the cradle 1 to the primary coil 4 and the distance Z1 from the terminal-side positioning portion 6 to the secondary coil 5 on the mobile phone unit 2 is set so that the center positions of the coils substantially match when the mobile phone unit 2 is loaded in the terminal loading portion 40.

Figure 14:
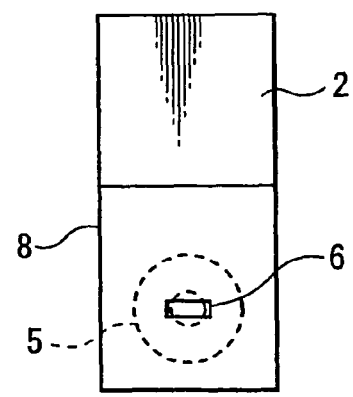
FIG. 14 is a view, when looking from the rear, of a mobile phone unit according to an embodiment of the invention where a terminal-side positioning portion is provided at a center position of a secondary coil.
Figure 15:
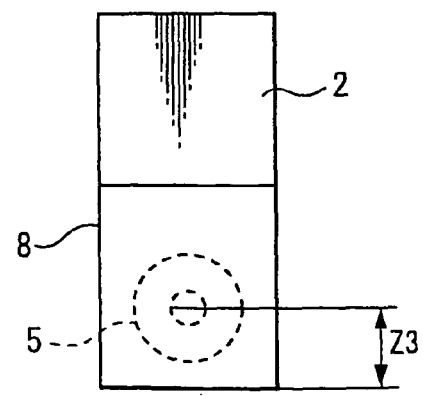
FIG. 15 is a view, when looking from the rear, of a mobile phone unit according to an embodiment of the invention that is not provided with a terminal-side positioning portion.
Figure 16:
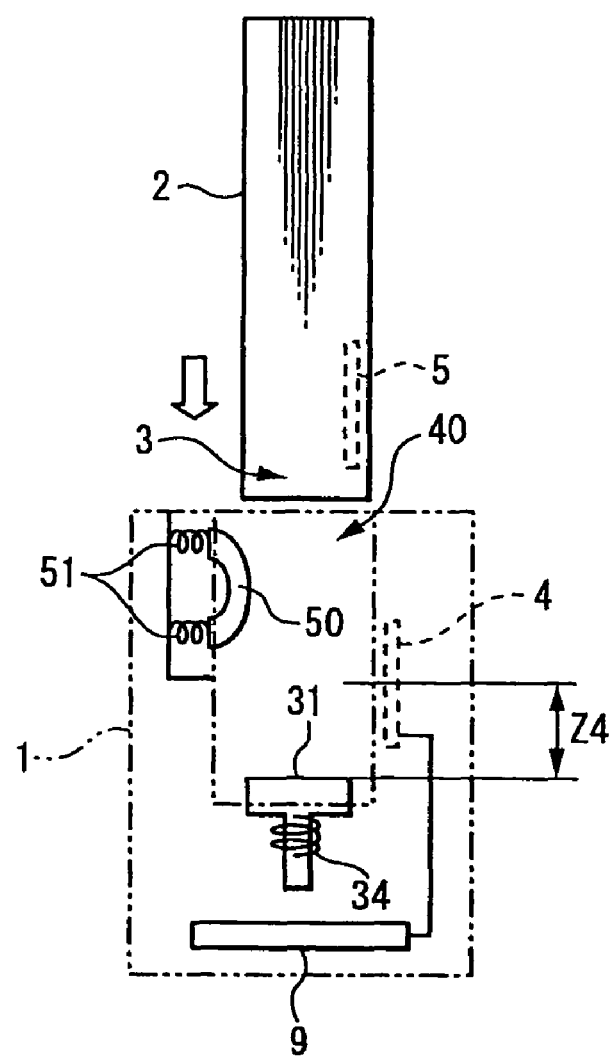
FIG. 16 is a view used for explaining positioning of a primary coil and a secondary coil for a mobile phone unit that is not provided with a terminal-side positioning portion and a cradle that is not provided with a cradle-side positioning portion.

An example construction where the terminal-side positioning portion 6 is provided on the battery cover 8 on the rear of the mobile phone unit 2 and is disposed at a position a predetermined distance from the coupling magnet 5 is shown in FIG. 2, FIG. 5 to FIG. 8, and FIG. 13. However, it is also possible to provide the terminal-side positioning portion 6 on the case of the mobile phone unit 2 itself, or as shown in FIG. 14, the terminal-side positioning portion 6 may be provided in the center position of the secondary coil 5. In the example shown in FIG. 14, the disposed position of the cradle-side positioning portion 7 may also be determined in accordance with the position of the terminal-side positioning portion 6. Also, the cradle-side positioning portion 7 may be concave and the terminal-side positioning portion 6 may be convex. The convex positioning portion continuously protrudes in the example described above. However, the convex positioning portion may be constructed so as to retract (i.e., slide) into the wall surface when the mobile phone unit 2 is being loaded in the terminal loading portion 40 and to then protrude from the wall surface and fit into the facing concave positioning portion when the mobile phone unit 2 has been completely loaded in the terminal loading portion 40. As described earlier, the disposed positions of the cradle-side positioning portion 7 and the terminal-side positioning portion 6 may be any of above, below, right, left, or central relative to the coils. However, in any of such cases, it is important for the positioning portions to be disposed so that the center positions of the primary coil 4 and the secondary coil 5 become aligned. Alternatively, as shown in FIG. 15, it is also possible to eliminate the terminal-side positioning portion 6 and carry out positioning using only the distance Z3 from the case base surface of the terminal end portion 3 of the mobile phone unit 2 to the secondary coil 5. In the example in FIG. 15, as shown in FIG. 16, the cradle-side positioning portion 7 may be no longer required on the cradle 1, but the distance Z4 from the case base surface contacting portion 33 of the up-down-direction pressing portion 31 to the primary coil 4 may need to substantially match the distance Z3.

The thickness direction pressing portion 50 is circular in form with a large radius of curvature. One example is constructed so that when the terminal end portion 3 of the mobile phone unit 2 is loaded inside the terminal loading portion 40, the thickness direction pressing portion 50 contacts a case front surface of the terminal end portion 3 of the mobile phone unit 2. Further, the thickness direction pressing portion 50 presses and supports the mobile phone unit 2 in the thickness direction using the reaction forces of two coil springs 51, each of which has one end portion in contact with a spring retaining portion, not shown, on the cradle 1.

As shown in FIG. 6, when the terminal end portion 3 of the mobile phone unit 2 is not loaded inside the terminal loading portion 40, the thickness direction pressing portion 50 protrudes out by a maximum distance inside the terminal loading portion 40 due to the reaction forces of the two coil springs 51.

As shown in FIGS. 8 and 9, the terminal end portion 3 of the mobile phone unit 2 is loaded inside the terminal loading portion 40 and then the case front surface of the mobile phone unit 2 contacts the thickness direction pressing portion 50. In this state, due to the reaction forces of the coil springs 51, the thickness direction pressing portion 50 presses the mobile phone unit 2, from a case front surface side thereof, onto the wall surface of the terminal loading portion 40 where the cradle-side positioning portion 7 is provided. That is, according to the present embodiment, when the terminal end portion 3 of the mobile phone unit 2 is loaded inside the terminal loading portion 40, the pressing force due to the thickness direction pressing portion 50 maintains the state where the convex part of the cradle-side positioning portion 7 fits inside the concave part of the terminal-side positioning portion 6.

On the other hand, when the terminal end portion 3 of the mobile phone unit 2 is removed from the terminal loading portion 40, the force applied to the two coil springs 51 due to the contact between the case front surface of the terminal end portion 3 of the mobile phone unit 2 and the thickness direction pressing portion 50 is removed. As a result, as shown in FIG. 6, the thickness direction pressing portion 50 returns due to the reaction forces of the two coil springs 51 to the state where the thickness direction pressing portion 50 protrudes out by the maximum distance inside the terminal loading portion 40.

As described earlier, in the present embodiment, by inserting the terminal end portion 3 of the mobile phone unit 2 into the opening of the terminal loading portion 40 of the cradle 1, the mobile phone unit 2 is supported inside the terminal loading portion 40 of the cradle 1. At the same time, the center positions of the primary coil 4 of the cradle 1 and the secondary coil 5 of the mobile phone unit 2 substantially match.

Note that although the primary coil 4 of the cradle 1 may be fixed inside the terminal loading portion 40, it is also possible to use an operating unit construction that moves the primary coil 4 up and down inside the terminal loading portion 40 in accordance with movement of the up-down-direction pressing portion 31.

Other Example Constructions of the Cradle

FIG. 17 to FIG. 21 show other example constructions of the cradle 1.

Figure 17:
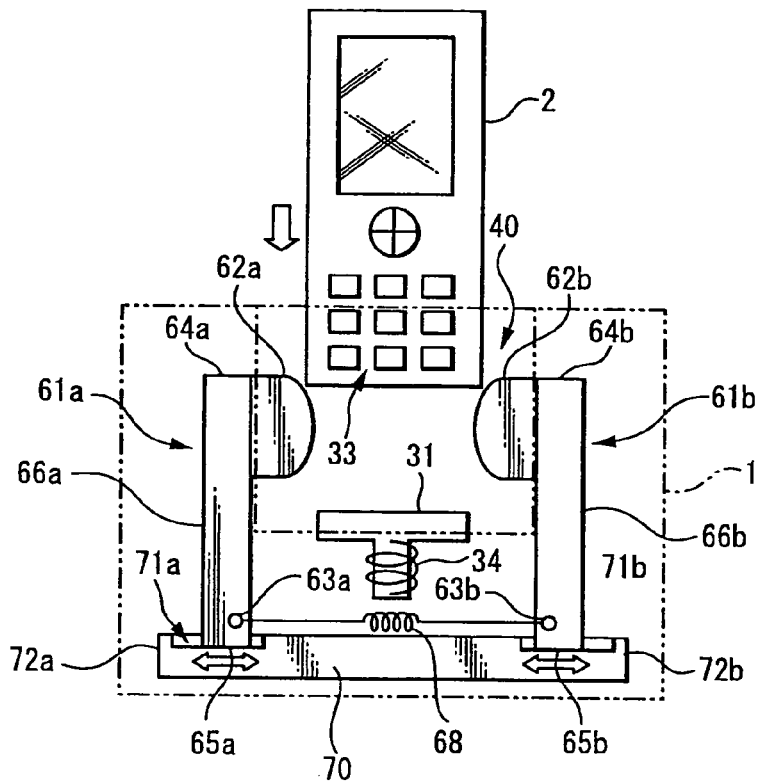
FIG. 17 is a view, in a state where a mobile phone unit is being attached to a cradle and when looking from the front of the mobile phone unit, of an example construction where the mobile phone unit is positioned in the width direction by causing width direction pressing portions to slide.
Figure 18:
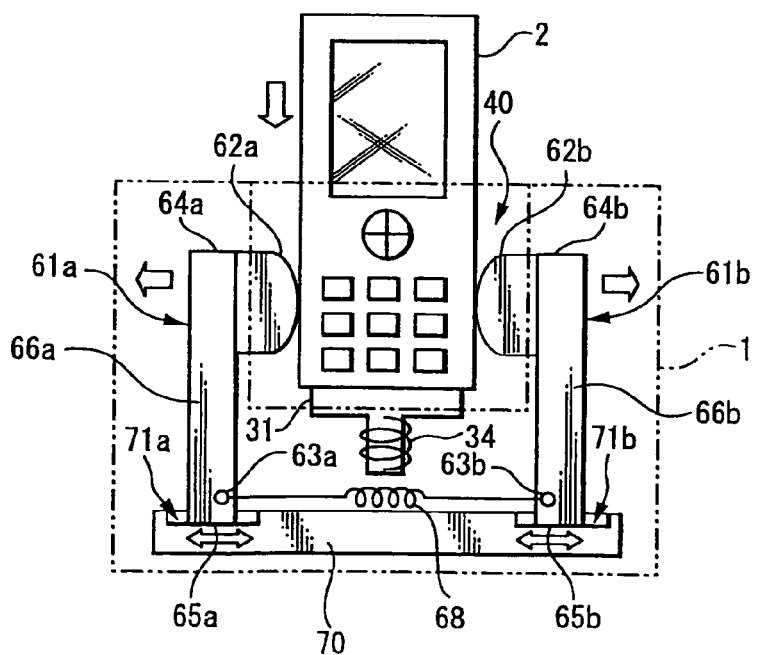
FIG. 18 is a view, in a state where the mobile phone unit has been attached to the cradle and when looking from the front of the mobile phone unit, of the example construction where the mobile phone unit is positioned in the width direction by causing width direction pressing portions to slide.

FIG. 17 and FIG. 18 show, as another example construction of the cradle 1, a construction including width direction pressing portions 61a, 61b and a slide rail portion 70. FIG. 17 shows a state where the mobile phone unit 2 is being loaded in the terminal loading portion 40 of the cradle 1 when looking from the front of the mobile phone unit 2. FIG. 18 shows a state where the mobile phone unit 2 has been loaded in the terminal loading portion 40 of the cradle 1 when looking from the front of the mobile phone unit 2.

In the example in FIG. 17 and FIG. 18, the slide rail portion 70 is fixed to an inside of the case of the cradle 1. The length direction of the slide rail portion 70 is disposed substantially perpendicular to the up-down direction for the terminal loading portion 40. The slide rail portion 70 includes a first arm rail portion 71a provided at one rail end portion 72a, and a second arm rail portion 71b provided at the other rail end portion 72b.

The width direction pressing portion 61a includes: a case side surface contacting portion 62a, a slide arm portion 66a, and a spring end engaging portion 63a. The case side surface contacting portion 62a presses and supports the mobile phone unit 2 from one side surface thereof by contacting one side surface of the terminal end portion 3 when the terminal end portion 3 of the mobile phone unit 2 is loaded inside the terminal loading portion 40. The slide arm portion 66a has one arm end portion 65a that makes sliding contact inside the first arm rail portion 71a of the slide rail portion 70 and the other arm end portion 64a to which the case side surface contacting portion 62a is attached. The spring end engaging portion 63a is provided near the arm end portion 65a and is engaged by one end of a coil spring 68. In the same way, the width direction pressing portion 61b includes: a case side surface contacting portion 62b, a slide arm portion 66b, and a spring end engaging portion 63b. The case side surface contacting portion 62b presses and supports the mobile phone unit 2 from the other side surface thereof by contacting the other side surface of the terminal end portion 3 when the terminal end portion 3 of the mobile phone unit 2 is loaded inside the terminal loading portion 40. The slide arm portion 66b has one arm end portion 65b that makes sliding contact inside the second arm rail portion 71b of the slide rail portion 70 and the other arm end portion 64b to which the case side surface contacting portion 62b is attached. The spring end engaging portion 63b is provided near the arm end portion 65b and is engaged by the other end of the coil spring 68. Note that the case side surface contacting portions 62a, 62b are both curved with a large radius of curvature.

As shown in FIG. 17, when the terminal end portion 3 of the mobile phone unit 2 is not loaded inside the terminal loading portion 40, due to the tension of the coil spring 68, the width direction pressing portions 61a, 61b and the slide rail portion 70 are positioned with the minimum distance between the case side surface contacting portions 62a, 62b inside the terminal loading portion 40.

As shown in FIG. 18, when the terminal end portion 3 of the mobile phone unit 2 is loaded inside the terminal loading portion 40, both side surfaces of the mobile phone unit 2 slide along the curved parts of the case side surface contacting portions 62a, 62b. The case side surface contacting portions 62a, 62b are pressed by the side surfaces of the mobile phone unit 2 and therefore move toward both sides of the terminal loading portion 40. While the case side surface contacting portions 62a, 62b are moving, the coil spring 68, ends of which engage the spring end engaging portions 63a, 63b, becomes extended. The arm end portions 65a, 65b respectively slide inside the first arm rail portion 71a and the second arm rail portion 71b of the slide rail portion 70 so that the slide arm portions 66a, 66b move apart. By doing so, when the terminal end portion 3 of the mobile phone unit 2 is loaded inside the terminal loading portion 40, the mobile phone unit 2 is pressed and supported from the width direction thereof by both case side surface contacting portions 62a, 62b.

On the other hand, when the terminal end portion 3 of the mobile phone unit 2 is removed from the terminal loading portion 40, as shown in FIG. 17, the force applied by the side surfaces of the mobile phone unit 2 to the case side surface contacting portions 62a, 62b to push both portions 62a, 62b toward both sides inside the terminal loading portion 40 is removed. As a result, due to the tension of the coil spring 68, ends of which engage the spring end engaging portions 63a, 63b, both case side surface contacting portions 62a, 62b return to the state where the distance therebetween inside the terminal loading portion 40 is minimized.

Note that with the example shown in FIG. 17 and FIG. 18, in the same way as the example shown in FIG. 11 and FIG. 12, it is also possible to use a construction where surface contact is achieved between the case side surface contacting portions 62a, 62b and the mobile phone unit 2 and a construction where protective members are further provided.

Figure 19:
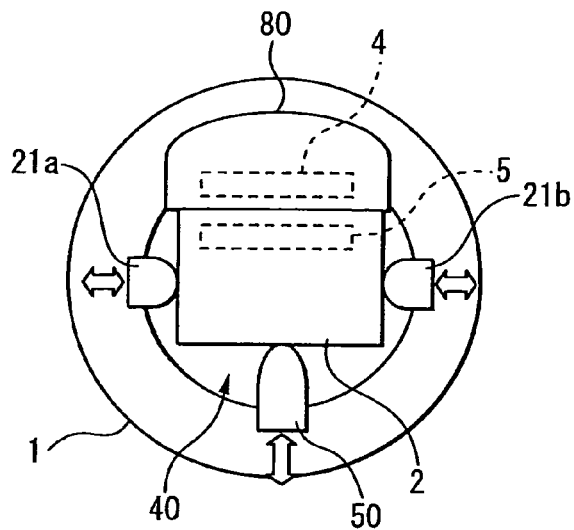
FIG. 19 is a view, when looking from above (i.e., from the opening side of a terminal loading portion), of a state where the mobile phone unit has been attached to the cradle in an example construction where the cradle includes a cylindrical terminal loading portion.

FIG. 19 shows another example construction of the cradle 1 that is provided with a cylindrical terminal loading portion 40. FIG. 19 is a diagram showing a state where the mobile phone unit 2 has been loaded in the terminal loading portion 40 of the cradle 1 when looking from above (i.e., from the same side as the opening in the terminal loading portion 40).

In the example shown in FIG. 19, out of the wall surfaces of the terminal loading portion 40, a flat portion 80, inside which the primary coil 4 is disposed and which has a flat surface against which the rear surface of the mobile phone unit 2 is pressed, is provided on the opposite wall surface to the thickness direction pressing portion 50. Note that in the example in FIG. 19, the outer form of the case may not be cylindrical and may be quadrangular, for example.

Figure 20:
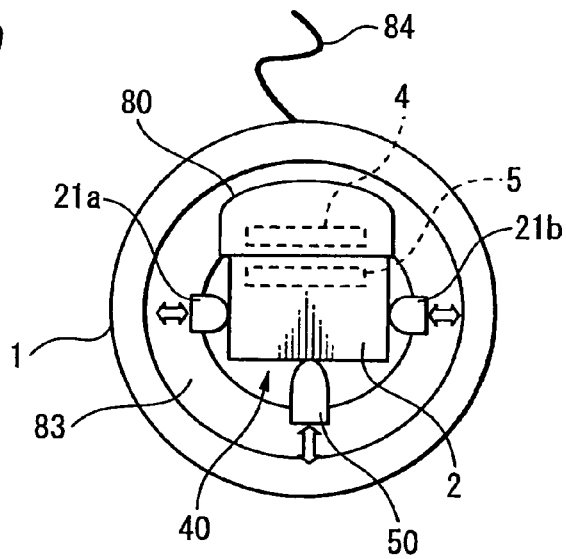
FIG. 20 is a view of an example construction where the cradle includes a cylindrical terminal loading portion where the cylindrical terminal loading portion and a cradle main body are rotatable relative to one another.
Figure 21:
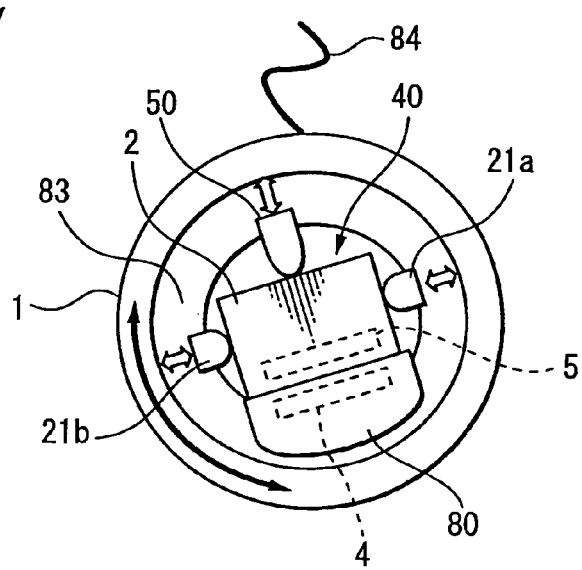
FIG. 21 is a view used for describing a state for the example construction in FIG. 20 where the cylindrical terminal loading portion and the cradle main body have been rotated relative to one another.

FIG. 20 and FIG. 21 show, as another example construction of the cradle 1, a construction that includes a cylindrical terminal loading portion 40 and is constructed so that the cylindrical terminal loading portion 40 can rotate relative to the cradle main body. FIG. 20 and FIG. 21 are diagrams showing a state where the mobile phone unit 2 has been loaded in the terminal loading portion 40 of the cradle 1 when looking from above (i.e., from the same side as the opening in the terminal loading portion 40). Note that the component element designated by reference numeral 84 in these drawings is a cable for inputting a power supply.

In the example in FIG. 20 and FIG. 21, the width-direction pressing portions 21a, 21b and related component elements (such as the coil spring 30 and the rotational shafts 22a, 22b), the thickness direction pressing portion 50 and the related component elements (such as the coil springs 51), the up-down-direction pressing portion 31, and the like are integrated into a single unit in the cylindrical terminal loading portion 40. As shown in FIG. 21, a unit 83 produced by integrating such components and a cradle main body 82 are rotatable relative to one another.

According to the construction shown in FIG. 20 and FIG. 21, the integrated unit 83 and the cradle main body 82 are rotatable relative to one another. When, for example, a mobile phone unit 2 whose display screen has a changeable orientation has been attached to the cradle 1, by rotating the integrated unit 83 and the cradle main body 82 relative to one another, it will be possible to always orient the display screen of the mobile phone unit 2 so as to face the user. When doing so, it will also be possible to avoid a state where the display is difficult to view, such as when the power cord or the like is in the user's way.

As described earlier, according to the present embodiment, the terminal end portion 3 of the mobile phone unit 2 is simply inserted into the opening of the terminal loading portion 40 of the cradle 1. That is, by carrying out an extremely simplified operation for the user, the mobile phone unit 2 can be supported inside the terminal loading portion 40 of the cradle 1. At the same time, the primary coil 4 of the cradle 1 and the secondary coil 5 of the mobile phone unit 2 can be disposed at optimal positions, or in other words, enable the center positions thereof to be aligned substantially perfectly, and the coils can be disposed with substantially a predetermined distance (i.e., the designed value) therebetween.

Also, the present embodiment is constructed so that the opening of the terminal loading portion 40 of the cradle 1 has a sufficient size for loading a plurality of types of mobile phone units of different external forms and sizes and so that positioning is carried out inside the terminal loading portion 40 in the width direction, the thickness direction, and the up-down direction of the mobile phone unit to position the coils. Accordingly, when charging various types of mobile phone unit, by merely inserting the mobile phone unit into the terminal loading portion 40 of the cradle 1, it is possible to support the mobile phone unit, to make the center positions of the coils substantially match, and to set the distance between the coils at substantially the design value. Therefore, according to the present embodiment, there may be no limitations on the form of the mobile phone unit or on the form of the terminal mounting part of the cradle and it is therefore possible to charge a variety of types of mobile phone unit.

In this way, according to the present embodiment, the user is not constrained by the form of the mobile phone unit and can carry out charging easily by merely inserting the mobile phone unit into the cradle. Also, since it is possible to appropriately set the center positions of the primary coil and the secondary coil and the distance therebetween without restrictions on the form and the like of the mobile phone unit, it is possible to carry out contactless power transferring with extremely high efficiency.

Also, according to the present embodiment, since there may be no limitations on the form and the like of the mobile phone unit, it may be unnecessary to manufacture the cradle for each form and the like of the mobile phone unit. As a result, there may be no need to buy a new cradle when the user buys a new mobile terminal, for example.

In addition, according to the present embodiment, as shown in FIG. 20 and FIG. 21, the cradle is provided with a cylindrical terminal loading portion 40 and the integral unit 83 of the cylindrical terminal loading portion 40 and the cradle main body 82 are rotatable relative to one another. When charging a mobile phone unit where the front and rear of the screen can be reversed, for example, by rotating the cylindrical integrated unit 83, it is possible to obtain favorable usability whereby the screen of the mobile phone unit can be set facing the user. Further, it is possible to provide the user with a variety of mobile phone units with no reduction in the design freedom for such terminals.

Note that, with the present embodiment, the mobile phone unit 2 is inserted upright inside the terminal loading portion 40 of the cradle 1. Therefore, it is possible to obtain a cradle with a smaller footprint than a cradle that charges a mobile phone unit 2 disposed horizontally, which means that the cradle does not get in the way when placed on a table, for example.

The embodiments described above are only examples of the invention. Accordingly, it should be appreciated that the invention is not limited to the embodiments described above and can be subjected to a variety of design and other modifications without departing from the technical scope of the invention.

An example where positioning is carried out for contactless power transferring coils has been described in the above embodiments. Alternatively, it is also possible to apply the invention to positioning a coil antenna, which is used for an RFID (Radio Frequency-Identification) contactless IC card function that can be used in an electronic wallet, a train ticket or train pass, or for user authentication at an entryway, and a reader/writer for such coil antenna.

In addition, a mobile phone unit 2 and a cradle 1 for the mobile phone unit 2 have been described as examples in the above embodiments. However, the invention is not limited thereto and can be applied to various types of electronic appliance, such as a PDA (Personal Digital Assistant), a digital camera, a portable audio device, a portable video device, a portable navigation apparatus, and cradles for such electronic appliances.

It should be understood by those skilled in the art that various modifications, combinations, sub-combinations and alterations may occur depending on design requirements and other factors insofar as they are within the scope of the appended claims or the equivalents thereof.

What is claimed is:

1. A contactless power transferring apparatus comprising:
   a terminal loading portion which has an opening of a size that is at least larger than an outer form of a mobile terminal and in which a mobile terminal inserted from the opening is loaded;
   a primary coil that is disposed with a coil surface thereof substantially in parallel with a wall surface of the terminal loading portion and transfers power using electromagnetic induction to a secondary coil incorporated in the mobile terminal;

an up-down-direction pressing portion operable when the mobile terminal is inserted inside the terminal loading portion, to operate in an up-down direction that is a mobile-terminal loading and removing direction so as to press and support a case base surface of the mobile terminal from below and position the primary coil and the secondary coil of the mobile terminal in the up-down direction;

a width direction pressing portion operable when the mobile terminal is inserted inside the terminal loading portion, to operate in a width direction of the mobile terminal so as to press and support the mobile terminal from the width direction and position the primary coil and the secondary coil of the mobile terminal in a left-right direction; and a thickness direction pressing portion operable when the mobile terminal is inserted inside the terminal loading portion, to operate in a thickness direction of the mobile terminal so as to press and support the mobile terminal from the thickness direction and dispose the primary coil and the secondary coil of the mobile terminal a predetermined distance apart.

2. A contactless power transferring apparatus according to claim 1, wherein the up-down direction pressing portion includes:

a case base surface contacting portion operable when the mobile terminal is loaded inside the terminal loading portion, to contact the case base surface of the mobile terminal and press and support the mobile terminal from below; and a compression spring that applies a reaction force that presses the case base surface contacting portion upward from below.

3. A contactless power transferring apparatus according to claim 2, wherein the width direction pressing portion includes:

a case side surface contacting portion operable when the mobile terminal is loaded inside the terminal loading portion, to contact both side surfaces of the mobile terminal and press and support the mobile terminal from both sides thereof; and a force converting portion that converts a downward pressing force, which acts when the up-down direction pressing portion is pressed down due to the weight of the mobile terminal when the mobile terminal is loaded inside the terminal loading portion, to forces applied by the case side surface contacting portion to both side surfaces of the mobile terminal.

4. A contactless power transferring apparatus according to claim 3, wherein the case side surface contacting portion of the width direction pressing portion includes a first case side surface contacting portion that contacts one side surface of the mobile terminal to press and support the one side surface of the mobile terminal; and a second case side surface contacting portion that contacts another side surface of the mobile terminal to press and support the other side surface of the mobile terminal, and wherein the force converting portion of the width direction pressing portion includes a first force transmitting portion and a second force transmitting portion, the first force transmitting portion having a first rotation shaft provided on an apparatus case;

a first upper arm portion that connects the first rotation shaft and the first case side surface contacting portion;

a first rear surface contacting portion that faces the case base surface contacting portion of the up-down direction pressing portion and contacts a rear surface thereof;

a first spring end engaging portion engaged by one end of a tension spring;

a first lower arm portion that connects the first rear surface contacting portion and the first spring end engaging portion to the first rotation shaft, and the second force transmitting portion having a second rotation shaft provided on the apparatus case;

a second upper arm portion that connects the second rotation shaft and the second case side surface contacting portion;

a second rear surface contacting portion that faces the case base surface contacting portion of the up-down direction pressing portion and contacts a rear surface thereof;

a second spring end engaging portion engaged by another end of the tension spring; and a second lower arm portion that connects the second rear surface contacting portion and the second spring end engaging portion to the second rotation shaft.

5. A contactless power transferring apparatus according to claim 1, wherein the width direction pressing portion includes:

a first case side surface contacting portion that contacts one side surface of the mobile terminal to press and support the one side surface of the mobile terminal;

a second case side surface contacting portion that contacts another side surface of the mobile terminal to press and support the other side surface of the mobile terminal;

a slide rail portion that is fixed to an apparatus case inner portion, is disposed with a length thereof substantially perpendicular to an up-down direction of the terminal loading portion, and includes a first arm rail portion at one end portion thereof and a second arm rail portion at another end portion thereof;

a first slide arm portion that has one arm end portion in sliding contact inside the first arm rail portion of the slide rail portion and another end portion to which the first case side surface contacting portion is attached;

a second slide arm portion that has one arm end portion in sliding contact inside the second arm rail portion of the slide rail portion and another end portion to which the second case side surface contacting portion is attached;

a first spring end engaging portion that is provided near the one arm end portion of the first slide arm portion and is engaged by one end of a tension spring; and a second spring end engaging portion that is provided near the one arm end portion of the second slide arm portion and is engaged by another end of the tension spring.

6. A contactless power transferring apparatus according to claim 1, wherein the thickness direction pressing portion is operable when the mobile terminal is loaded inside the terminal loading portion, to contact a case surface of the mobile terminal and press the mobile terminal toward a wall surface where the primary coil is disposed using a reaction force of a spring.

7. A contactless power transferring apparatus according to claim 1, further comprising an apparatus-side positioning portion that is disposed at a predetermined position relative to the primary coil and operable when the mobile terminal is loaded inside the terminal loading portion, to align center positions of the primary coil and the secondary coil by engaging a terminal-side positioning portion disposed at a predetermined position relative to the secondary coil of the mobile terminal.

8. A contactless power transferring apparatus according to claim 1, wherein the terminal loading portion is substantially cylindrical, and the cylindrical terminal loading portion, the primary coil, the up-down direction pressing portion, the width direction pressing portion, and the thickness direction pressing portion are integrated to construct a unit that is rotatable with respect to an apparatus main body.

9. A contactless power transferring apparatus according to claim 1, wherein the width direction pressing portion includes a case side surface contacting portion operable when the mobile terminal is loaded inside the terminal loading portion, to make surface contact with both side surfaces of the mobile terminal to press and support the mobile terminal from both sides thereof.

10. A contactless power transferring apparatus according to claim 9, wherein the case side surface contacting portion of the width direction pressing portion includes a protective portion at parts that contact both side surfaces of the mobile terminal.

* * * * *